UNITED STATES PATENT OFFICE.

GEORGE TAYLOR, OF REDDING, CALIFORNIA.

MEDICAL COMPOUND.

SPECIFICATION forming part of Letters Patent No. 294,288, dated February 26, 1884.

Application filed August 13, 1883. (No specimens.)

*To all whom it may concern:*

Be it known that I, GEORGE TAYLOR, of Redding, county of Shasta, and State of California, have invented an Improvement in a Medical Compound; and I hereby declare the following to be a full, clear, and exact description thereof.

My invention relates to a compound which is especially useful in the treatment of diseases such as rheumatism, neuralgia, toothache, and nervous diseases; and it consists of a mixture of powdered buckeye nuts or kernels, ginger, and Cayenne pepper, as will be more fully explained hereinafter.

In the preparation of my compound I use the ingredients in the following proportions: buckeye-nuts, finely pulverized, one pound; Cayenne pepper, one ounce; ground ginger, one ounce. These ingredients are to be thoroughly mixed in a mill, or by other suitable means, after which they may be put up dry for sale or use.

In some cases it may be found advisable to make an extract or tincture; but the effect will be essentially the same.

When the compound is to be used, it is taken internally in doses of one-fourth of a teaspoonful taken in a little water at bed-time, and again after breakfast in the morning. This dose may be increased to one-half of a teaspoonful, if necessary.

I am aware that the use of powdered buckeye alone is not new, nor do I claim such as my invention. I am also aware of the use of ginger and Cayenne pepper in the well-known "Composition Tea."

Having thus described my invention, what I claim as new, and desire to secure by Letters Patent, is—

The herein-described composition of matter, consisting of pulverized buckeye-nuts, Cayenne pepper, and ground ginger, in the proportions specified.

In witness whereof I have hereunto set my hand.

GEORGE TAYLOR.

Witnesses:
S. W. FRISBIE,
E. DICKINSON.